United States Patent
Chiu et al.

(10) Patent No.: US 9,309,116 B2
(45) Date of Patent: Apr. 12, 2016

(54) METHOD FOR PRODUCING HIGH CONCENTRATION AQUEOUS HF SOLUTIONS

(75) Inventors: Yuon Chiu, Denville, NJ (US); Richard Durick Horwath, Morristown, NJ (US); Stephen A. Cottrell, Churchville, NY (US)

(73) Assignee: Honeywell International Inc., Morris Plains, NJ (US)

( * ) Notice: Subject to any disclaimer, the term of this patent is extended or adjusted under 35 U.S.C. 154(b) by 1107 days.

(21) Appl. No.: 13/245,394

(22) Filed: Sep. 26, 2011

(65) Prior Publication Data

US 2013/0078180 A1 Mar. 28, 2013

(51) Int. Cl.
C01B 7/19 (2006.01)

(52) U.S. Cl.
CPC .................................. C01B 7/195 (2013.01)

(58) Field of Classification Search
CPC ........ C01B 7/191; C01B 7/195; B01D 53/14; B01D 53/1487; B01D 2257/70; B01D 11/04
USPC ................. 423/483, 488, 245.1; 95/184, 233; 210/634, 767
See application file for complete search history.

(56) References Cited

U.S. PATENT DOCUMENTS

| | | | |
|---|---|---|---|
| 3,431,071 A | 3/1969 | Simpson et al. | |
| 3,873,629 A | 3/1975 | Jones | |
| 4,147,756 A | 4/1979 | Dahlstrom et al. | |
| 4,806,233 A | 2/1989 | James, Jr. et al. | |
| 5,382,724 A | 1/1995 | Ohno et al. | |
| 5,405,590 A | 4/1995 | Macedo et al. | |
| 5,437,848 A * | 8/1995 | Hard | 423/7 |
| 5,895,639 A * | 4/1999 | Swain et al. | 423/483 |
| 5,900,044 A | 5/1999 | Barsotti | |
| 6,270,742 B1 | 8/2001 | Ewing et al. | |
| 6,677,493 B1 | 1/2004 | Miller et al. | |
| 6,759,018 B1 | 7/2004 | Arno et al. | |
| 2002/0156331 A1 | 10/2002 | Ewing et al. | |
| 2011/0009660 A1 | 1/2011 | Krueger et al. | |

FOREIGN PATENT DOCUMENTS

| | | |
|---|---|---|
| CN | 1083037 A | 3/1994 |
| CN | 101300215 A | 11/2008 |
| DE | 1567494 A1 | 9/1970 |
| EP | 286449 A1 | 10/1988 |
| WO | 9800380 A1 | 1/1998 |

OTHER PUBLICATIONS

Chein, Hungmin; Aggarwal, Shankar G.; Wu, Hsin-Hsien, Efficient Control System for Low-Concentration Inorganic Gases from a Process Vent Stream: Application of Surfactants in Spray and Packed Columns, Environmental Science & Technology, vol. 38, pp. 5766-5772, Nov. 1, 2004, American Chemical Society.
PCT ISR & Written Opinion issued in PCT/US2012/056269 dated Mar. 21, 2013.

(Continued)

*Primary Examiner* — Ngoc-Yen Nguyen
(74) *Attorney, Agent, or Firm* — Bruce O. Bradford

(57) ABSTRACT

Disclosed are methods used to remove HF from a fluorocarbon containing stream, thereby forming a final aqueous HF solution having both a high HF concentration and low dissolved organic content.

4 Claims, 2 Drawing Sheets

(56) References Cited

OTHER PUBLICATIONS

EPO Examination Report issued in corresponding European Application No. 12836006.2, dated Jul. 8, 2015.
Office Action and Search issued in corresponding Chinese Application No. 201280046420.2, dated May 7, 2015.

* cited by examiner

)
METHOD FOR PRODUCING HIGH CONCENTRATION AQUEOUS HF SOLUTIONS

BACKGROUND OF THE INVENTION

In fluorocarbon processes where hydrogen fluoride (HF) is present in the process streams used to make the fluorocarbon compounds, the removal of HF from the process stream by scrubbing with water often results in an aqueous HF solution containing a substantial amount of dissolved organics. The subsequent sale of such aqueous HF solutions can be limited due to the presence of the dissolved organics. Likewise, special transportation containers may be required to accommodate both the acidic and the organic content of such solutions. In order to find wider sales outlets for such solutions, a high acid concentration, i.e., greater than 35% wt. HF is also desirable.

The present invention meets these needs by producing (1) an aqueous HF solution with low dissolved organic content, as well as (2) a highly concentrated HF solution, also with low dissolved organic content.

SUMMARY OF THE INVENTION

The present invention is directed to methods and systems used to remove HF from a fluorocarbon containing process stream, and thereby forming an isolated aqueous HF solution having both a high HF concentration and low organic content. The process stream is scrubbed with a hot aqueous HF solution, wherein the temperature is kept at or above the dewpoint of the organic materials in the process stream, thereby preventing the dissolving of the organic materials into the isolated HF solution.

As used herein, the term "low organic content" refers to the amount of organic material remaining in the isolated aqueous HF solution as processed according to the present invention. Typically the low organic content of the HF solution is less than about 500 ppm, preferably less than about 250 ppm, more preferably less than about 150 ppm, and most preferably less than about 100 ppm of organics components.

In one embodiment, the present invention provides methods and systems used for the removal of HF from organic process streams by means of a scrubber system designed to operate at a bottom temperature zone higher than the dewpoint condensing temperature of the organic mixture. In this embodiment, the scrubber system comprises two sections; where the bottom section is scrubbed with an aqueous HF solution having a preselected concentration of HF, and the top section is scrubbed with an aqueous HF solution having a lower HF concentration than the bottom section's HF solution. In addition, the bottom section is operated at a temperature that is above the dewpoint condensing temperature of the organic components in the process stream being scrubbed.

In another embodiment, the present invention comprises a method and system in which a recycled aqueous HF solution (e.g., up to about 38% wt. HF) is contacted with an HF laden liquid organic stream to extract the HF content from the organic stream. The resulting HF solution typically achieves an HF content greater than the azeotrope composition of 38% wt.

DETAILED DESCRIPTION OF THE INVENTION

Figure 1:
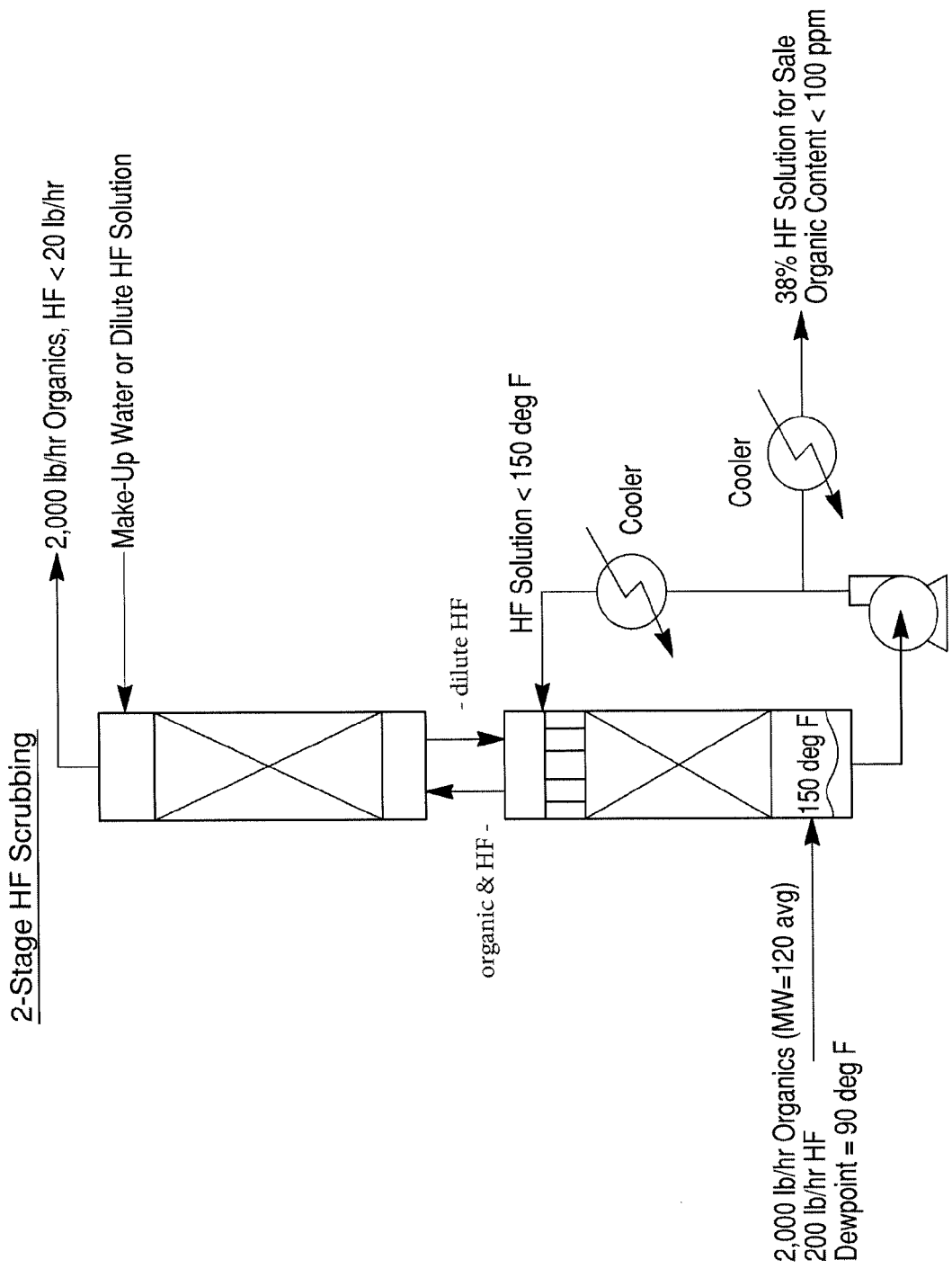
FIG. 1 shows a two-stage scrubber system useful in one process of the present invention.

As illustrated in FIG. 1, an embodiment of this invention is directed to a method and system used to remove HF from an organic product stream, using a scrubber system designed to operate at a bottom temperature zone which is higher than the dewpoint condensing temperature of the organic mixture.

The scrubber system comprises two sections; wherein the bottom section (1) is scrubbed with aqueous HF solution operating at a higher temperature than the dewpoint condensing temperature of the organic mixture, and wherein the top section (2) is operating with an aqueous HF solution having lesser concentration than the bottom section's HF solution.

This method and system provides a resulting aqueous HF solution which is substantially free of dissolved organics, while maintaining a high overall HF removal efficiency. The resulting aqueous HF solution will have a significant market outlet and it can be transported using conventional containers employed for aqueous acid service.

In a typical fluorocarbon manufacturing process where the organic stream containing less than 15% molar HF concentration, the present method and system generally will limit the resulting aqueous HF solution to no more than about 38% wt. HF, due to the formation of an HF/water azeotrope composition at about this concentration level.

Figure 2:
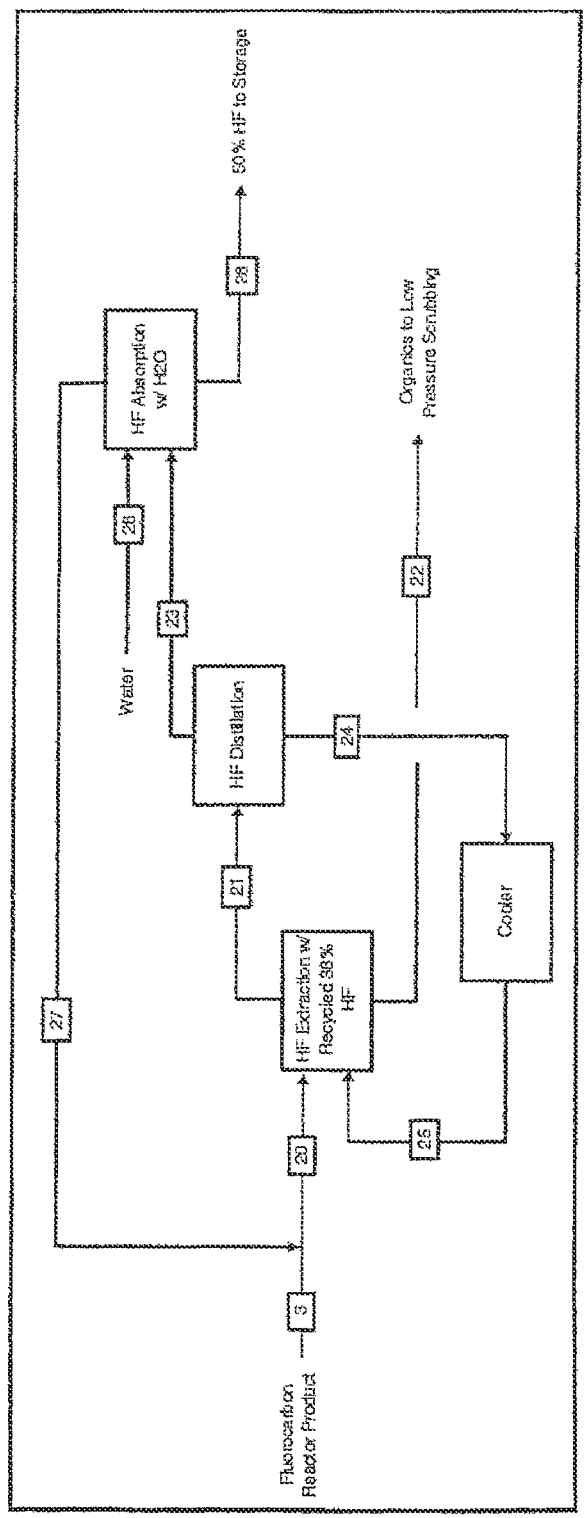
FIG. 2 shows a liquid extraction unit operation useful in one process of the present invention.

As illustrated in FIG. 2, another embodiment of this invention enhances the HF concentration, while still maintaining a low dissolved organic level. This enhanced product solution will also have a significant market outlet.

This embodiment of the invention comprises a method and system in which a recycled aqueous HF solution (e.g., up to about 38% wt. HF) is contacted with an HF laden liquid organic stream to extract the HF content from the organic stream. The resulting HF solution typically achieves an HF content greater than the azeotrope composition of 38% wt.

In this method and system, the HF is fed to multi-stage vapor-liquid equilibrium separator. This device separates the HF and water mixture into two vapor streams, a first stream having an HF content greater than the 38% wt. of the azeotrope composition of HF and water (e.g., greater than 50% wt. HF); and a second aqueous HF stream having an HF content near, but still above the 38% wt. HF azeotrope composition (e.g., greater than about 40% wt. HF).

The second aqueous HF stream (near but above the 38% wt. HF azeotrope composition) is recycled to extract more HF as described above. The first vapor stream, rich in HF content and above the azeotrope composition of 38% wt. HF (e.g., greater than 50% wt. HF), is condensed or absorbed with water or absorbed with condensing steam to form a commercially desirable, highly concentrated, aqueous HF solution, having a concentration, for example, greater than about 40% wt. HF.

The absorbing step is carried out in a multi-stage absorber where the emerging HF solution is kept hot (e.g., near or above the dewpoint of the organics) to eliminate dissolving organic in the product HF solution. The vapor leaving the multistage absorber will contain organic and a significant amount of HF. This organic stream can be recaptured and recycled to extract the HF content as described above.

This method will afford a resulting aqueous HF solution which is substantially free of dissolved organics and has a higher HF concentration, while maintaining high overall HF removal efficiency from the organic stream. The resulting aqueous HF solution will have wider market outlet and can be transported with conventional container for aqueous acid service.

Example for the First Embodiment

A 38% HF solution at about 150° F. is circulated to the top section of the second stage of the two-stage scrubber system. Most of the HF in the organic stream is removed by this hot circulating HF solution. The resulting hot HF solution contains a low level, i.e., less than about 500 ppm, preferably less than about 250 ppm, more preferably less than about 150 ppm, and most preferably less than about 100 ppm of dissolved organics. This material may be isolated from this stage of the two-stage scrubber system and is suitable for sale or other use as desired.

A 38% HF solution at about 150° F. is circulated to the top section of the second stage of the two-stage scrubber system. Most of the HF in the organic stream is removed by this hot circulating HF solution. The resulting hot HF solution contains a low level, i.e., less than about 500 ppm, preferably less than about 250 ppm, more preferably less than about 150 ppm, and most preferably less than about 100 ppm of dissolved organics. This material may be isolated from this stage of the two-stage scrubber system and is suitable for sale or other use as desired.

The organic component leaving the top section of the second stage of the two-stage scrubber, containing some residual unscrubbed HF, flows to the bottom section of the first stage of the two-stage scrubber system. In this section, water or aqueous HF solution having a lower HF concentration than the product solution is used to scrub the residual HF from the organic component. These two materials may then be isolated from this stage of the two-stage scrubber system and are suitable for sale or other use as desired.

Example for the Second Embodiment

As illustrated in FIG. 2, about 2,000 lb/hr of liquid fluorocarbon organic mixture (3), having a dewpoint condensing temperature of 90° F. and containing 200 lb/hr HF, is combined with a small recycle stream of organics and HF (27). The resultant stream (20) is mixed with 1,500 lb/hr 39% wt. recycle HF solution (25). It is then phase separated at below 50° F. Commonly this system is known as a liquid extraction unit operation. The extraction can be conducted as a single stage as described, or it can be of multi-stage contactors to enhance the extraction efficiency.

The liquid organic mixture layer (22), having most of its HF content extracted, is sent to low pressure scrubbing (e.g., FIG. 1) for further purification. The aqueous HF solution layer (21), now enriched to 44% wt. HF which can still contain some dissolved organic, is heat economized with another process stream to raise the temperature and sent to a multi-stage falling film exchanger where it separates the solution to an overhead gas (23) containing 86% wt. HF and balance of water vapor and small amount of organic, and a bottom aqueous solution of 39% wt. HF (24), which is near but above the 38% wt. HF/water azeotrope composition. This solution (24) is then heat economized, cooled, and recycled (25) to extract more HF from the incoming liquid organic stream.

The overhead vapor gas (23) is sent to a multi-stage absorber with optional condenser. Water or steam (26) is introduced at various locations of the absorber to absorb or condensed HF into 50% wt. solution (28). If higher concentration is desired, then less water or steam is added. The bottom of the absorber is kept above 150° F. to strip off the organics. The resulting hot HF solution product (28) contains a low level of dissolved organic and can be sent out for sales after cooling.

The vapor (27) leaving the multistage absorber will contain organic and significant amount of HF. This organic stream (27) can be re-captured and recycled to extract its HF content.

While the present invention has been particularly shown and described with reference to preferred embodiments, it will be readily appreciated by those of ordinary skill in the art that various changes and modifications may be made without departing from the scope of the invention. It is intended that the claims be interpreted to cover the disclosed embodiment, those alternatives which have been discussed above and all equivalents thereto.

What is claimed is:

1. A process for separation of HF from its mixture with a liquid fluorocarbon organic process stream, comprising the steps of:
   (a) a liquid fluorocarbon organic mixture containing HF is mixed with an aqueous HF solution and then subjected to phase separation into a liquid organic phase and a liquid aqueous phase;
   (b) the liquid organic phase, having most of its HF content extracted, is isolated;
   (c) the liquid aqueous phase comprises an HF solution which may contains up to about 500 ppm of dissolved organic, is sent to a multi-stage falling film exchanger where it separates the solution into (1) an overhead gas phase containing 86% wt. HF and (2) a bottom aqueous solution containing 39% wt. HF,
   (d) the 39% wt. HF solution is recycled to extract more HF from the incoming liquid fluorocarbon organic process stream, and the overhead gas is sent to a multi-stage absorber where water or steam is introduced to form a 50% wt. HF aqueous solution which is then isolated; and
   (e) wherein the vapor leaving the multistage absorber is recycled to step (a) to extract its HF content.

2. The process of claim 1, wherein the organic content of the separated HF solution is less than about 250 ppm.

3. The process of claim 1, wherein the organic content of the separated HF solution is less than about 150 ppm.

4. The process of claim 1, wherein the organic content of the separated HF solution is less than about 100 ppm.

* * * * *